(12) United States Patent
Fader et al.

(10) Patent No.: US 7,351,330 B1
(45) Date of Patent: Apr. 1, 2008

(54) IRON AND HYDROGEN SULFIDE REMOVAL APPARATUS

(75) Inventors: Robert T. Fader, Willmar, MN (US);
Wes J. Gunderson, Willmar, MN (US)

(73) Assignee: Willmar Water & Spas, Willmar, MN (US)

( * ) Notice: Subject to any disclaimer, the term of this patent is extended or adjusted under 35 U.S.C. 154(b) by 90 days.

(21) Appl. No.: 11/136,898

(22) Filed: May 25, 2005

Related U.S. Application Data

(60) Provisional application No. 60/578,725, filed on Jun. 10, 2004.

(51) Int. Cl.
*C02F 1/74* (2006.01)

(52) U.S. Cl. .................. 210/120; 137/143; 137/205; 137/416.3

(58) Field of Classification Search .................. 210/90
See application file for complete search history.

(56) References Cited

U.S. PATENT DOCUMENTS

| 4,659,463 | A | * | 4/1987 | Chandler et al. ........... 210/202 |
| 4,966,692 | A | * | 10/1990 | Overy ........................ 210/123 |
| 5,096,596 | A | | 3/1992 | Hellenbrand et al. |
| 5,744,040 | A | * | 4/1998 | Slates et al. ................ 210/664 |
| 6,627,070 | B1 | * | 9/2003 | Frank ......................... 210/120 |
| 6,878,293 | B1 | | 4/2005 | Portyrata et al. |
| 7,156,995 | B2 | * | 1/2007 | Maas et al. ................ 210/278 |
| 7,204,930 | B2 | * | 4/2007 | Nightingale ............... 210/741 |

OTHER PUBLICATIONS

Product Sheet entitled "Aer-Max Systems, for sulfur and iron problems", pp. 1-2, date unavailable.

* cited by examiner

*Primary Examiner*—Peter A. Hruskoci
(74) *Attorney, Agent, or Firm*—Kinney & Lange, P.A.

(57) ABSTRACT

An automated system controls operation of a filtration system. The filtration system includes an aeration tank and a filtration tank. The system includes a pressure sensor, an air pump, a bleed passage, and a pressure control. The pressure sensor measures a pressure in the aeration tank. The air pump and the bleed passage are connected to the aeration tank and are controlled by the pressure control based on the pressure measured in the aeration tank.

6 Claims, 4 Drawing Sheets

IRON AND HYDROGEN SULFIDE REMOVAL APPARATUS

BACKGROUND OF THE INVENTION

The present application relates to the field of iron and hydrogen sulfide removal. In particular, the present invention relates to an automated system for controlling the air pressure in an aeration tank.

The presence of iron and hydrogen sulfide in well water can result in undesirable tastes, smells, stains, and corrosion. To prevent the negative effects of iron and hydrogen sulfide in water, the contaminants are typically removed from the well water by a filtration system. The filtration system includes an aeration tank and a filtration tank that remove the iron and hydrogen sulfide from the water through oxidation and filtration. The iron and hydrogen sulfide are oxidized in the aeration tank by a head of oxygen-rich air that is maintained in the aeration tank by an air pump. As air is pumped into the aeration tank, the air pressure in the tank steadily increases and must be released to prevent overpressure in the aeration tank. The pressure is released through a bleed passage connected to the aeration tank. After the iron and hydrogen sulfide have been oxidized in the aeration tank, the water is transported to the filtration tank where the iron and hydrogen sulfide are removed from the water.

An automated removal control system currently in use employs a timer to control the introduction of air into the aeration tank according to a predetermined time cycle. Because this system is controlled solely as a function of time and is unrelated to the condition of the aeration tank, the level of oxygen in the aeration tank is not monitored and the system may not run often enough. Power is consumed unnecessarily when the air pump and bleed passage are activated even though there is a sufficient supply of air in the aeration tank. When the system fails to run and there is an insufficient amount of air in the aeration tank, the iron and hydrogen sulfide in the water are not properly oxidized and cannot be effectively filtered from the water.

BRIEF SUMMARY OF THE INVENTION

An automated system controls operation of a filtration system. The filtration system includes an aeration tank and a filtration tank. The system includes a pressure sensor, an air pump, a bleed passage, and a pressure control. The pressure sensor measures a pressure in the aeration tank. The air pump and the bleed passage are connected to the aeration tank and are controlled by the pressure control based on the pressure measured in the aeration tank.

DETAILED DESCRIPTION

Figure 1:
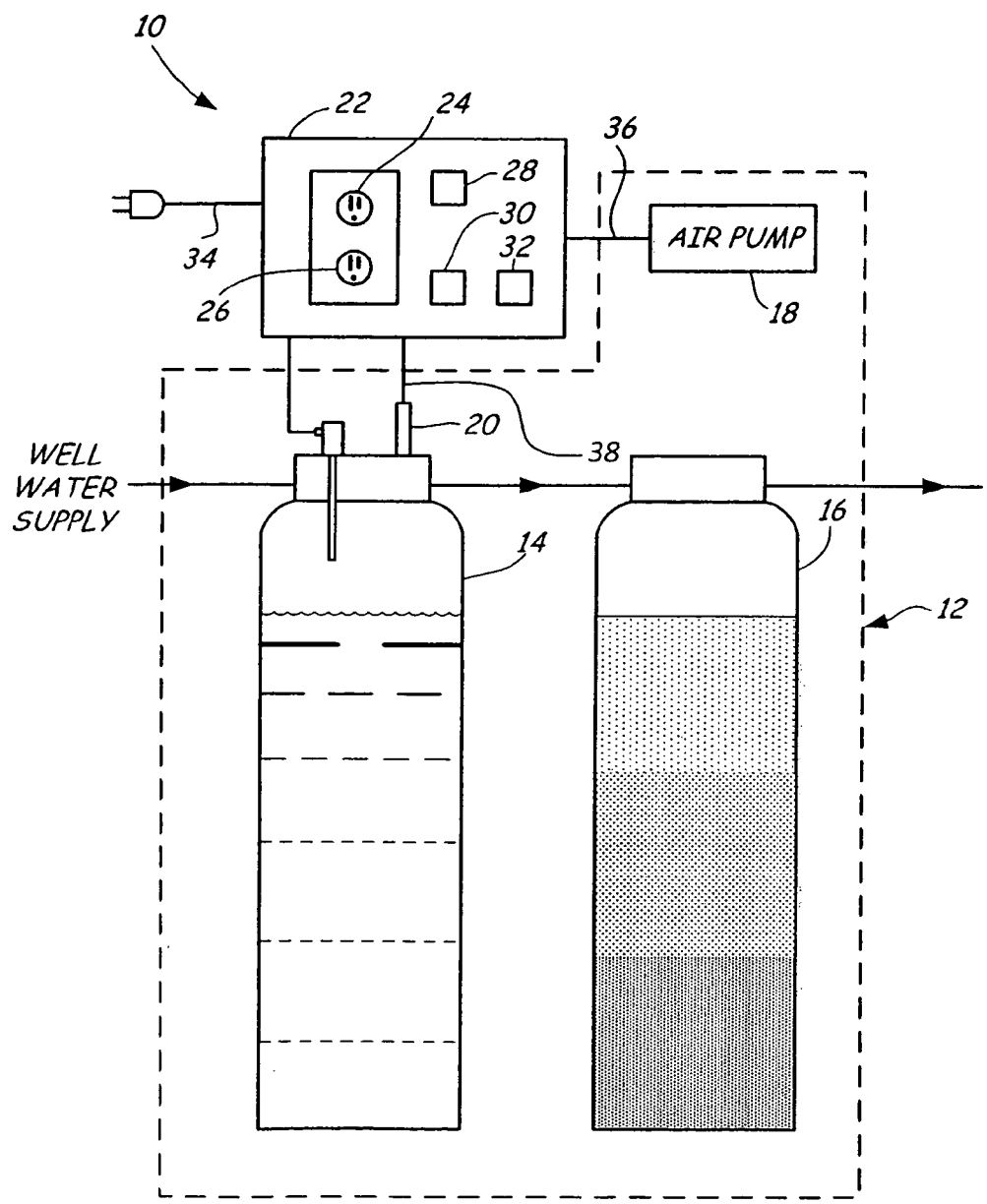
FIG. 1 is a diagram of an iron and hydrogen sulfide removal control system of the present invention connected to a filtration system.

FIG. 1 is a diagram of removal control system 10 of the present invention connected to filtration system 12. Removal control system 10 is an automated system for operating filtration system 12 which removes contaminants, such as iron and hydrogen sulfide, from water as a function of the pressure in filtration system 12. Filtration system 12 comprises aeration tank 14, filtration tank 16, air pump 18, and valve 20. Aeration tank 14 receives a supply of air from air pump 18 and releases excess pressure through valve 20. Aeration tank 14 connects filtration system 12 to the well water supply and delivers water to filtration tank 16. Filtration tank 16 supplies the filtered water from filtration system 12 to the intended destination. Removal control system 10 measures and controls the pressure in aeration tank 14 through air pump 18 and valve 20. Although FIG. 1 depicts valve 20 as an on/off valve, valve 20 may be any type of bleed passage that allows pressure to be released from aeration tank 14. In one embodiment, valve 20 is a solenoid pilot valve.

Automated removal control system 10 comprises housing 22, pump outlet 24, valve outlet 26, pressure sensor 28, pressure switch 30, relay switch 32, and power supply cord 34. Air pump 18 and valve 20 are connectable to housing 22 at pump outlet 24 and valve outlet 26 by pump enable line 36 and valve enable line 38, respectively, in order to receive power. Once air pump 18 and valve 20 are connected to a power source, air pump 18 and valve 20 are controlled by pressure sensor 28 through pressure switch 30 and relay switch 32. When pressure switch 30 and relay switch 32 are open, electric current cannot reach air pump 18 or valve 20. When pressure switch 30 and relay switch 32 are closed, electric current is able to reach air pump 18 and valve 20. Power supply cord 34 is connected to a 110 volt household outlet and supplies the electric current necessary to run air pump 18 and valve 20 of removal control system 10.

Automated removal control system 10 maintains a head of air in aeration tank 14 that is necessary to oxidize the iron and hydrogen sulfide in the water by activating and deactivating air pump 18 and valve 20 based on the pressure in aeration tank 14. The pressure in aeration tank 14 is regulated by pressure sensor 28, pressure switch 30, and relay switch 32, which control air pump 18 and valve 20. Pressure switch 30 is adjustable and can be set at varying open and close pressure levels depending on the specifications of each filtration system. In one embodiment, pressure switch 30 is an adjustable pressure switch, 20-120 pounds per square inch, ¼ inch national pipe thread male, Single Pull Double Throw, manufactured by Transducers Direct, LLC.

Pressure sensor 28 continuously measures the pressure in aeration tank 14 and communicates the information to pressure switch 30. When the pressure in aeration tank 14 is either at or below a first pressure level $P_1$, there is an insufficient head of air in aeration tank 14 and oxygen-rich air must be introduced into aeration tank 14 in order to properly oxidize the iron and hydrogen sulfide in the water. In response to detecting pressure in aeration tank 14 below first pressure level $P_1$, pressure sensor 28 causes pressure switch 30 to enable relay switch 32, which controls the supply of electric current to pump outlet 24 and valve outlet 26. When pump outlet 24 provides electric current through pump enable line 36, air pump 18 turns on and provides oxygen-rich air to aeration tank 14. When valve outlet 26 provides electric current through valve enable line 38, valve 20 powers on and bleeds any excess air and water from aeration tank 14. Air is pumped into aeration tank 14 by air pump 18 at a greater rate than the rate at which air is allowed to leave through valve 20, so the pressure in aeration tank 14 steadily increases. Once the pressure in aeration tank 14 rises to a second pressure level $P_2$, there is a sufficient head of air in aeration tank 14 and pressure sensor 28 causes pressure switch 30 and relay switch 32 to open and power off air pump 18 and valve 20.

In one embodiment, the first pressure level $P_1$ is approximately 28-32 pounds per square inch, and the second pressure level $P_2$ is approximately 38-45 pounds-per square inch.

Figure 2:
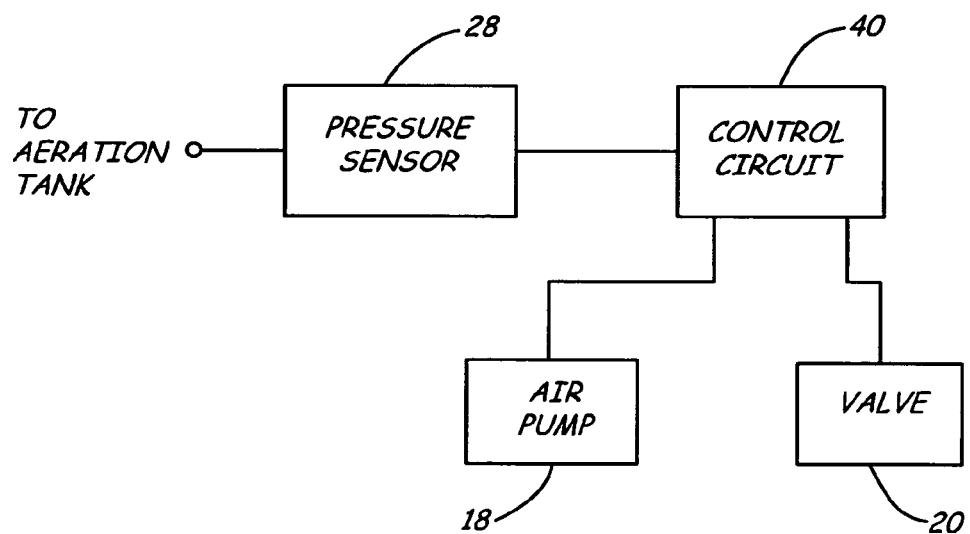
FIG. 2 is a block diagram of the iron and hydrogen sulfide removal control system of the present invention.

FIG. 2 is a block diagram of automated removal control system 10 showing pressure sensor 28, control circuit 40, which in an exemplary embodiment includes pressure switch 30 and relay switch 32, air pump 18, and valve 20. Pressure sensor 28 measures the pressure in aeration tank 14 (shown in FIG. 1) and communicates the information to control circuit 40. When the pressure in aeration tank 14 falls below first pressure level $P_1$, control circuit 40 closes pressure switch 30 and relay switch 32 to activate air pump 18 and valve 20. As air is pumped into aeration tank 14, pressure sensor 28 continues to measure the pressure in aeration tank 14 and communicate the information to control circuit 40. Once the pressure in aeration tank 14 rises above second pressure level $P_2$, control circuit 40 opens pressure switch 30 and relay switch 32 to deactivate air pump 18 and valve 20.

In another embodiment, pressure sensor 28 is implemented as a transducer that receives, and subsequently communicates, a pressure signal to control circuit 40. When the transducer determines that the pressure in aeration tank 14 is below first pressure level $P_1$, it communicates an electronic signal representing this information to control circuit 40, which then activates air pump 18 and valve 20. When the transducer determines that the pressure in aeration tank 14 is above second pressure level $P_2$, it communicates an electronic signal representing that information to control circuit 40, which then deactivates air pump 18 and valve 20.

Figure 3:
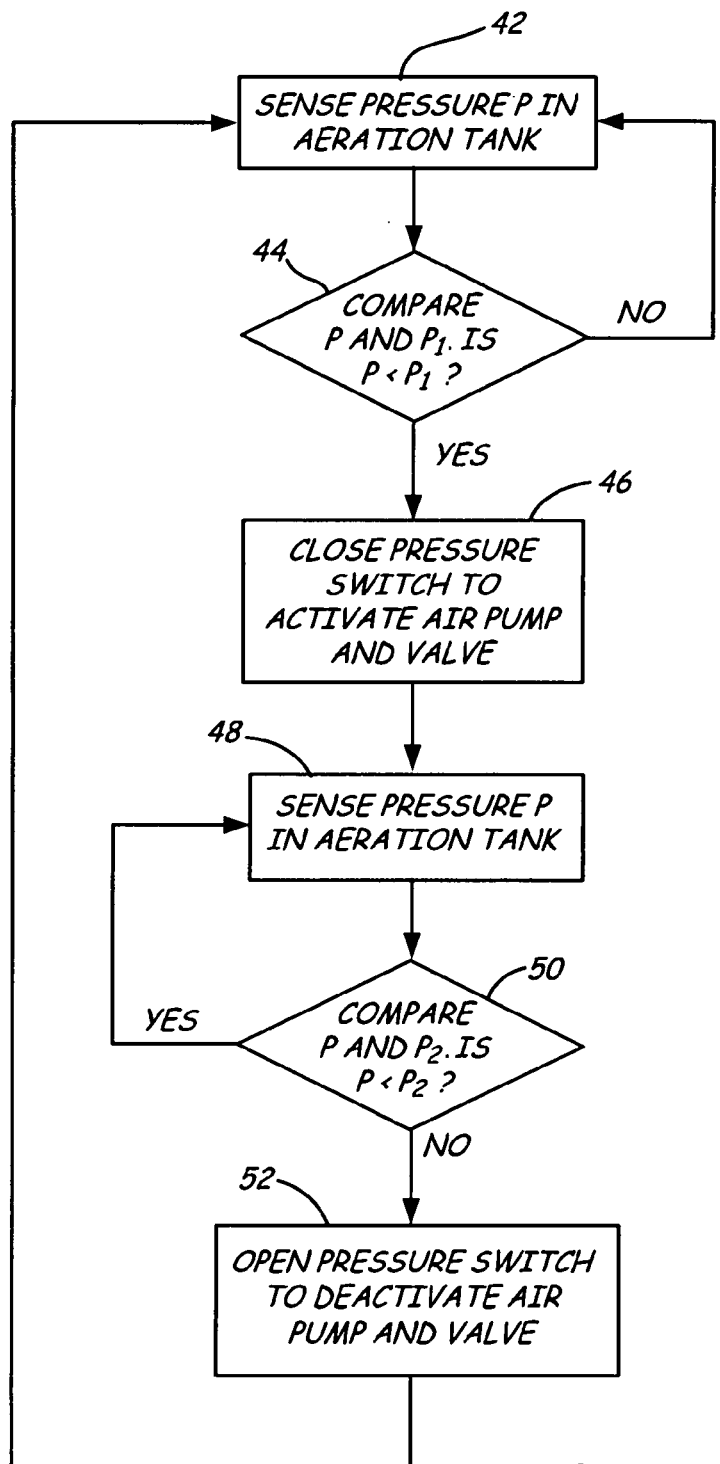
FIG. 3 is a flow diagram of a first embodiment of the iron and hydrogen sulfide removal control system of the present invention.

FIG. 3 is a flow diagram illustrating the operation of automated removal control system 10 according to a first embodiment of the present invention. Initially, air pump 18 and valve 20 are powered off. Pressure sensor 28 continuously measures pressure P in aeration tank 14, as indicated by box 42. Pressure P is then compared to first pressure level $P_1$, as depicted by decision box 44. If pressure P is greater than first pressure level $P_1$, air pump 18 and valve 20 remain powered off and pressure sensor 28 continues to measure pressure P in aeration tank 14 and compare it to first pressure level $P_1$. If pressure P is less than first pressure level $P_1$, air pump 18 and valve 20 are activated, as indicated by box 46.

After air pump 18 and valve 20 are activated, pressure sensor 28 continues to measure pressure P in aeration tank 14 and compare it to second pressure level $P_2$, as shown in box 48. As depicted by decision box 50, pressure P is then compared to second pressure level $P_2$. If pressure P is less than second pressure level $P_2$, air pump 18 and valve 20 remain powered on and pressure sensor 28 continues to measure pressure P in aeration tank 14 and compare it to second pressure level $P_2$ Once pressure P in aeration tank 14 rises above second pressure level $P_2$, air pump 18 and valve 20 are powered off, as indicated by box 52.

In an exemplary embodiment, first and second pressure levels $P_1$ and $P_2$ are determined by a high limit and a low limit set on pressure switch 30 (shown in FIG. 1). The frequency and length of runtime for air pump 18 and valve 20 are determined by the pressure in aeration tank 14, which in turn is dependent on the flow rate and the amount of water running through the fixture connected to the well water supply pumping water into aeration tank 14. Typically, first pressure level $P_1$ is set as close as possible to the pressure at which the well cuts in. Second pressure level $P_2$ is set approximately 8 to 15 pounds per square inch (psi) greater than first pressure level $P_1$ to ensure that enough air is introduced into aeration tank 14 to oxidize the iron and hydrogen sulfide in the water. In one embodiment, first and second pressure levels $P_1$ and $P_2$ are set at approximately 30 psi and 40 psi, respectively.

Figure 4:
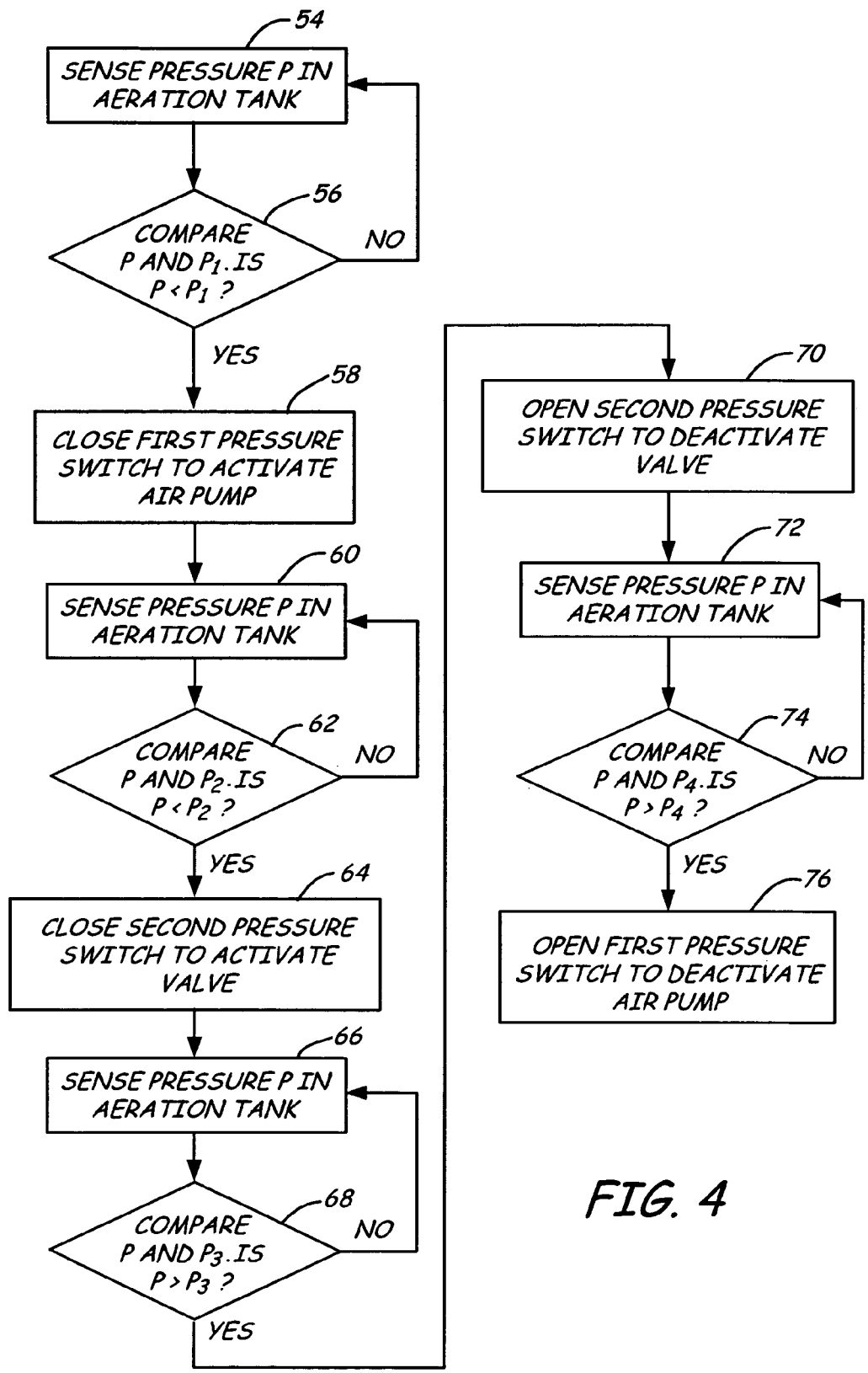
FIG. 4 is a flow diagram of a second embodiment of the iron and hydrogen sulfide removal control system of the present invention.

FIG. 4 is a flow diagram illustrating the operation of automated removal control system 10 according to a second embodiment of the present invention. In the second embodiment, air pump 18 and valve 20 run independently of each other so that there are four pressure levels, a high limit and a low limit corresponding to a maximum pressure and a minimum pressure for air pump 18, respectively, and a high limit and a low limit corresponding to a maximum pressure and a minimum pressure for valve 20, respectively. As with the first embodiment, air pump 18 and valve 20 are initially powered off. Pressure sensor 28 continuously measures pressure P in aeration tank 14 as indicated in box 54. Pressure P is then compared to first pressure level $P_1$ to determine whether to activate air pump 18, as depicted by decision box 56. If pressure P is greater than first pressure level $P_1$, pressure sensor 28 continues to measure pressure P in aeration tank 14 and compare it to first pressure level $P_1$. If measured pressure P is less than first pressure level $P_1$, air pump 18 is activated, as indicated by box 58.

When air pump 18 is activated, pressure sensor 28 continues to measure pressure P in aeration tank 14, as indicated in box 60. Pressure P is then compared to second pressure level $P_2$ to determine whether to activate valve 20, as depicted by decision box 62. If pressure P is greater than second pressure level $P_2$, valve 20 remains powered off and pressure sensor 28 continues to measure pressure P in aeration tank 14 and compare it to second pressure level $P_2$. If measured pressure P is less than second pressure level $P_2$, valve 20 is activated, as indicated in box 64.

As shown in box 66, pressure sensor 28 continues to measure pressure P in aeration tank 14 and compare it to third pressure level $P_3$ to determine whether to deactivate valve 20, as depicted by decision box 68. If pressure P is less than third pressure level $P_3$, valve 20 remains activated and pressure sensor 28 continues to measure pressure P in aeration tank 14 and compare it to third pressure level $P_3$. If measured pressure P is greater than third pressure level $P_3$, valve 20 is powered off, as indicated in box 70.

After valve 20 is powered off, pressure sensor 28 measures pressure P in aeration tank 14, as indicated by box 72, and compares it to fourth pressure level $P_4$ to determine whether to deactivate air pump 18, as depicted by decision box 74. If pressure P is less than fourth pressure level $P_4$, air pump 18 remains powered on and pressure sensor 28 continues to measure pressure P in aeration tank 14 and compare it to fourth pressure level $P_4$. Once pressure P in aeration tank 14 rises above fourth pressure level $P_4$, air pump 18 is powered off, as indicated by box 74.

In one embodiment, first and fourth pressure levels $P_1$ and $P_4$ are determined by a high limit and a low limit set on a first pressure switch and second and third pressure levels $P_2$ and $P_3$ are determined by a high limit and a low limit set on a second pressure switch. In a particular exemplary embodiment, first, second, third, and fourth pressure levels $P_1$, $P_2$, $P_3$, and $P_4$ are set at approximately 50 psi, 35 psi, 40 psi, and 69 psi, respectively.

The automated removal control system of the present invention provides a method for activating and deactivating an air pump and valve connected to an aeration tank to control the pressure within the aeration tank. The removal control system includes a pressure sensor which measures the pressure in the aeration tank. When the pressure in the aeration tank falls below a first pressure level, air is needed in the system to properly oxidize contaminants in the water in the aeration tank. In response to a signal from the pressure sensor, the removal control system closes a pressure switch and relay switch to activate the air pump and valve connected to the aeration tank. The valve bleeds excess pressure from the aeration tank as the air pump introduces air into the aeration tank in order to prevent overpressure in the aeration tank. Once the pressure in the aeration tank rises above a second pressure level, there is sufficient oxygen-rich air in the aeration tank and the air pump and the valve are deactivated.

Although the present invention has been described with reference to preferred embodiments, workers skilled in the art will recognize that changes may be made in form and detail without departing from the spirit and scope of the invention.

The invention claimed is:

1. A system for controlling operation of a water filtration system having an aeration tank and a filtration tank, the system comprising:
   a pressure sensor for measuring a pressure in the aeration tank;
   an air pump connected to the aeration tank;
   a valve for opening and closing a bleed passage connected to the aeration tank; and
   a pressure control for controlling the air pump and the bleed passage based on the pressure measured in the aeration tank, wherein the pressure control activates the air pump to supply air to the aeration tank and activates the valve to open the bleed passage when the pressure in the aeration tank reaches a minimum pressure level so that the pressure in the aeration tank steadily increases, and the pressure control deactivates the air pump to discontinue supplying air to the aeration tank and deactivates the valve to close the bleed passage when the pressure in the aeration tank reaches a maximum pressure level.

2. The system of claim 1, wherein the minimum pressure level is approximately 28-32 pounds per square inch.

3. The system of claim 1, wherein the maximum pressure level is approximately 38-45 pounds per square inch.

4. The system of claim 1 wherein the minimum pressure level is approximately the pressure level of the water supplied to the system.

5. The system of claim 4, wherein the maximum pressure level is between approximately 8 and 15 pounds per square inch greater than the minimum pressure level.

6. A system for controlling operation of a water filtration system having an aeration tank and a filtration tank, the system comprising:
   a pressure sensor for measuring a pressure in the aeration tank;
   an air pump connected to the aeration tank;
   a valve for opening and closing a bleed passage connected to the aeration tank; and
   a pressure control for controlling the air pump and the bleed passage based on the pressure measured in the aeration tank, wherein the pressure control activates the air pump to supply air to the aeration tank when the pressure in the aeration tank falls below a first pressure level, the pressure control activates the valve to open the bleed passage when the pressure in the aeration tank falls below a second pressure level so that the pressure in the aeration tank steadily increases, the pressure control deactivates the valve to close the bleed passage when the pressure in the aeration tank exceeds a third pressure level, and the pressure control deactivates the air pump to discontinue supplying air to the aeration tank when the pressure in the aeration tank exceeds a fourth pressure level.

* * * * *